Nov. 5, 1929.  O. P. R. LEHMANN  1,734,138
OVEN
Filed Nov. 30, 1927  4 Sheets-Sheet 1
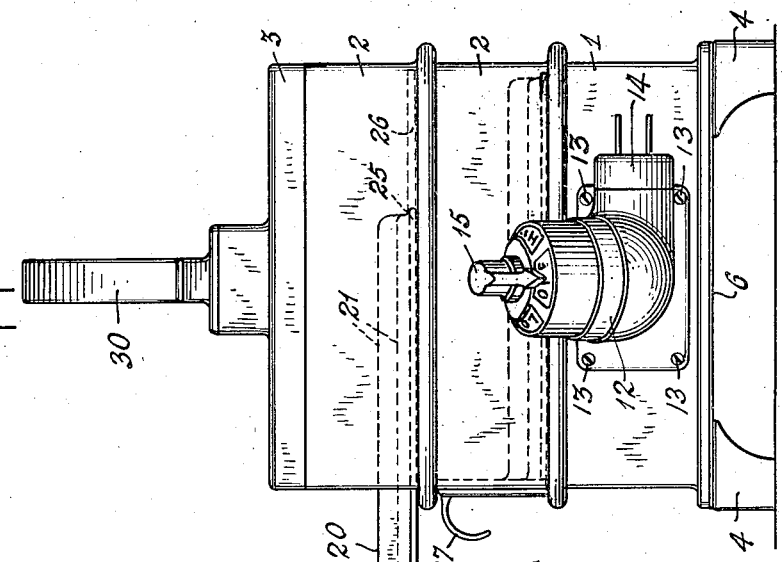
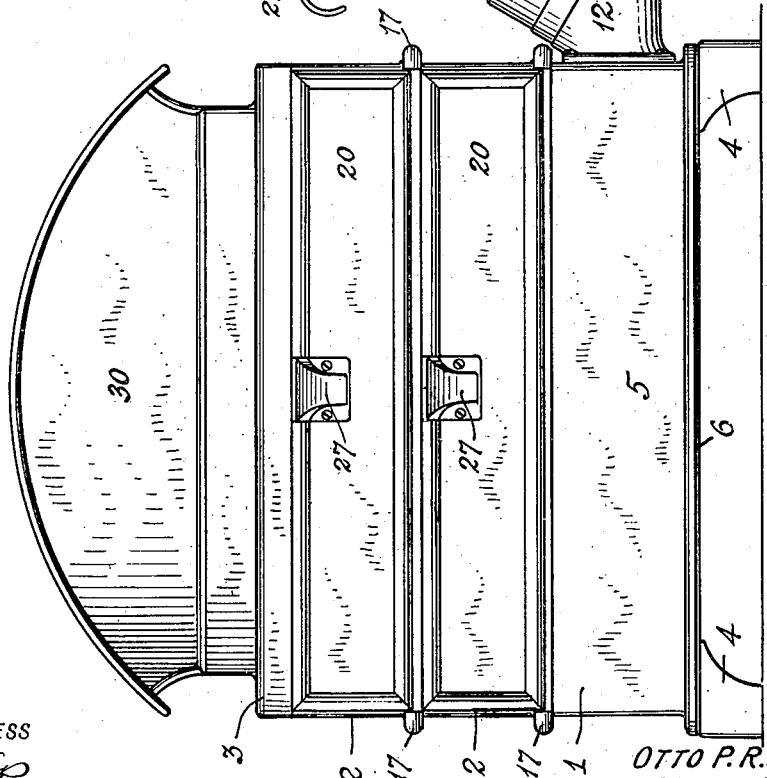
WITNESS
G. V. Rasmussen
INVENTOR
OTTO P. R. LEHMANN
BY
ATTORNEYS

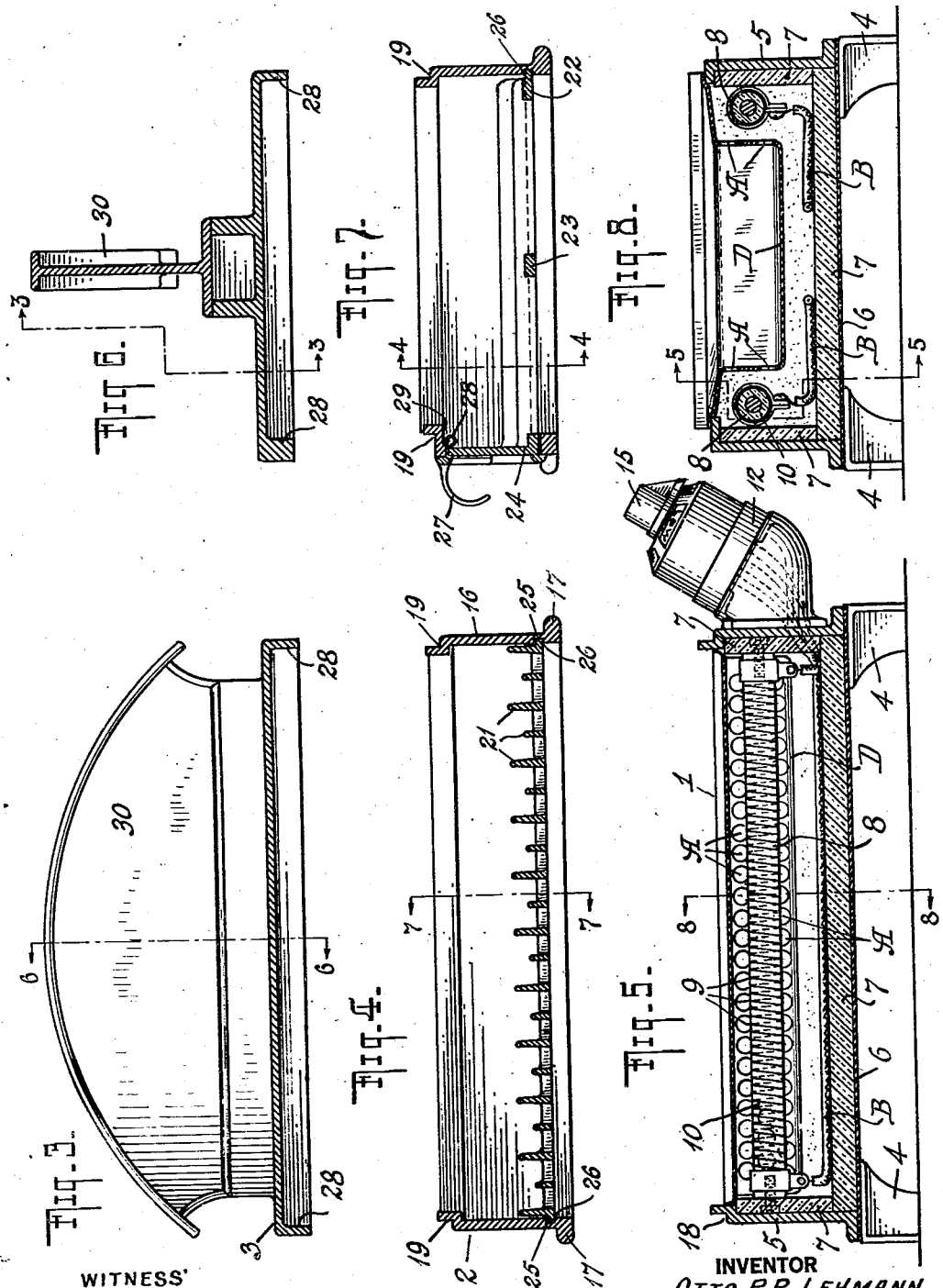

Nov. 5, 1929.　　　O. P. R. LEHMANN　　　1,734,138
OVEN
Filed Nov. 30, 1927　　　4 Sheets-Sheet 3

WITNESS
G. V. Rasmussen

INVENTOR
OTTO P. R. LEHMANN
BY
ATTORNEYS

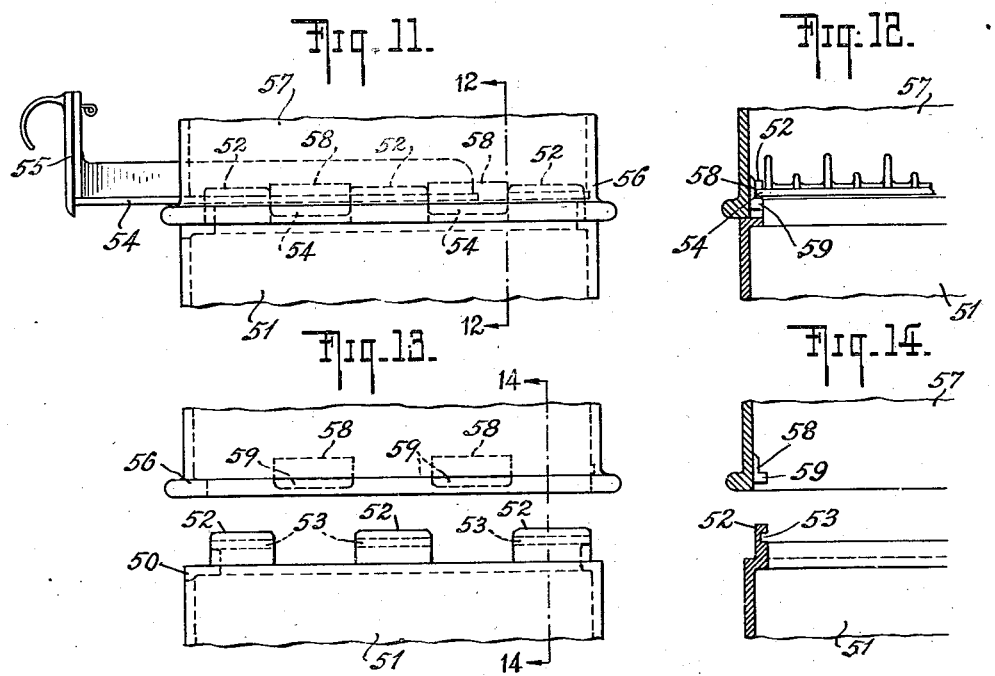

Patented Nov. 5, 1929

1,734,138

UNITED STATES PATENT OFFICE

OTTO PAUL RICHARD LEHMANN, OF NEWARK, NEW JERSEY

OVEN

Application filed November 30, 1927. Serial No. 236,606.

This invention relates to heating ovens, and more particularly to roasters for products like Frankfurters.

Heretofore various types of apparatus have been employed for roasting Frankfurters but the type generally employed was one having a large flat plate or grid which was heated usually by a gas burner. As is well known, the Frankfurters were placed upon the heated plate or grid in order to be roasted or heated. In the roasting of Frankfurters, first one side would be roasted while the other side was exposed to the relatively cool air above it, and then the exposed side would be turned upon the heated plate while the other side, now in a roasted condition, was exposed to the relatively cool air above it. This procedure and the apparatus in which it was carried out have many objections and disadvantages. One of the more important disadvantages is that the plate or grid roasters occupy a large area. Due to this fact a large space must be provided in the store, building, or the like for the housing of these large plate roasters. As a general rule, Frankfurters are sold at places, such as amusement parks, vacation or summer resorts, and crowded business sections of cities, where the value of land is high, and, consequently, the cost of renting such land or property thereon is correspondingly high. This means that in calculating the cost of operations of a business enterprise, a high annual rent must be allocated to the plate roasters. Another objection to the conventional type of Frankfurter roasters is that they are unsanitary because the Frankfurters, during roasting, are exposed to the open air and are contaminated with the dust and dirt which is blown on them by the wind. A further objection to the former roasters is that the roasting or heating is not effected properly because one portion of the Frankfurter is placed in direct contact with the heated surface while the other portions of the Frankfurter are subjected to the chilling action of relatively cool air. As a result of the improper roasting the skins become hard and tough, the Frankfurter may be over-roasted or even burned in spots, and the meat of the roasted Frankfurter is not very juicy or tender.

I have discovered that all of the aforesaid disadvantages and objections as well as others may be overcome by incorporating my invention in a structure of the class described. An object of my invention is to provide a closed apparatus for the roasting of products like Frankfurters. A further object is the provision of a sectional construction in a roaster so that a compact unit is provided requiring only a small space. The invention also contemplates providing a roaster which is absolutely sanitary, which is constituted of materials that transmit the heat efficiently and effectively to the heating grids, which roasts and heats the Frankfurters more or less uniformly, which is so constructed that in the operation thereof it is possible to maintain a reserve of hot roasted Frankfurters ready for sale without frizzling or toughening the Frankfurters, and which has the units so united to each other that a stable and solid structure is formed.

Other objects and advantages of my invention will become apparent from the following description taken in conjunction with the accompanying drawings in which:—

Fig. 1 is a front elevation of a roaster embodying the principles of my invention;

Fig. 2 is a side view of the roaster shown in Fig. 1 with the uppermost tray in a partly opened position;

Fig. 3 illustrates a sectional view of the top unit of the roaster taken on the line 3—3 of Fig. 6;

Fig. 4 is a sectional view of one of the intermediate units of the roaster taken on the line 4—4 of Fig. 7;

Fig. 5 is a sectional view of the foundation or bottom unit of the roaster taken on the line 5—5 of Fig. 8;

Figure 9:
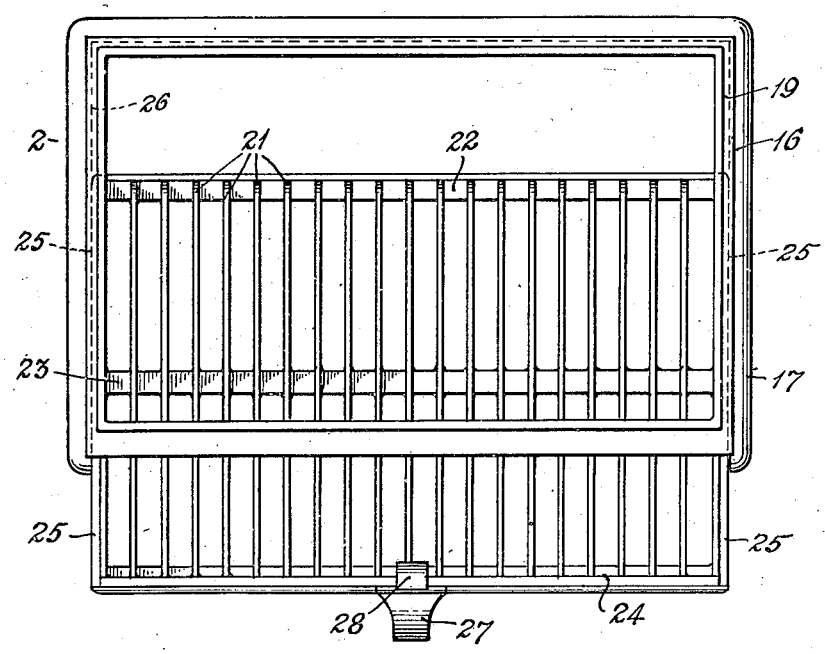
Figure 10:
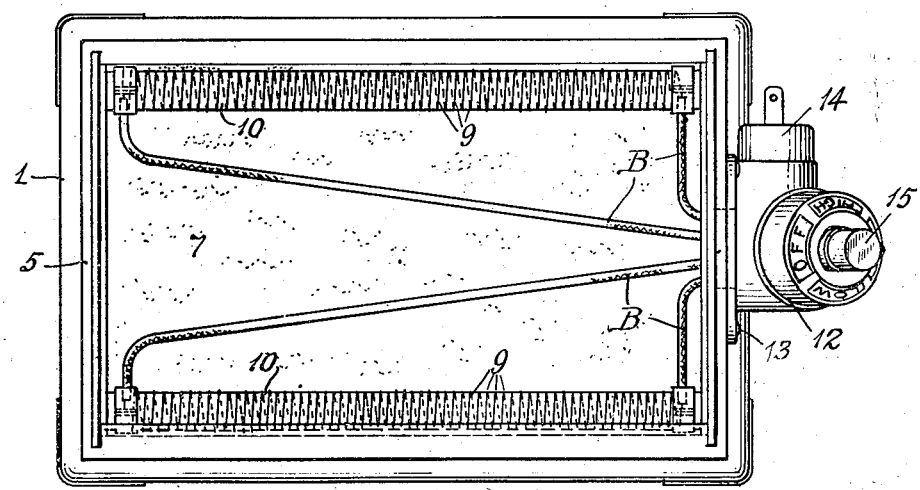

Figs. 6, 7 and 8 are sectional views taken respectively on the line 6—6 of Fig. 3, the line 7—7 of Fig. 4, and the line 8—8 of Fig. 5;

Fig. 9 is a plan view of the uppermost of the intermediate units of the roaster illustrated in Fig. 2;

Fig. 10 is a plan view of the bottom unit of the roaster depicted in Fig. 5;

Fig. 11 shows a fragmentary elevational view of a modified embodiment of my invention wherein the various units of my improved roaster may be interlocked with each other;

Fig. 12 is a sectional view taken on the line 12—12 of Fig. 11;

Fig. 13 depicts the units shown in Fig. 11 in a separated position;

Fig. 14 is a sectional view taken on the line 14—14 of Fig. 13;

Fig. 15 illustrates a fragmentary plan view of a modified form of tray; and

Fig. 16 is a sectional view taken on the line 16—16 of Fig. 15.

Generally speaking, my invention consists in providing a Frankfurter roaster with a closed, sectional construction. The bottom unit of my sectional structure constitutes the foundation for the entire roaster and has a heater and a drip or catch pan incorporated therein. Seated upon the foundation unit is an intermediate unit (or plurality of such units) containing a tray upon which the products to be roasted or heated are placed. In order to close the roaster a cover unit or dome is provided which fits on top of the uppermost intermediate unit.

Referring more specifically to the drawings the numeral 1 designates the foundation unit of the roaster upon which intermediate units 2 and a top unit or dome 3 are superimposed. The foundation unit is provided with a plurality of supporting legs 4 which may be secured to the rectangular frame 5 in any convenient manner but preferably cast integral therewith. Within the rectangular frame 5 and supported by floor 6 is a lining 7 of refractory material which insulates a heater 8, herein shown as an electric heating element, from the surrounding environment. The heater may have any appropriate construction but it is illustrated as being composed of a helically shaped resistance element 9 wound upon a core 10 which may be suitably supported as by means of screws 11 projecting from the side portions of lining 7 into the ends of the core. By locating a heater of sufficient size, as one skilled in the art will readily understand, at the front and at the rear of the frame 5, sufficient heat can be developed to roast or heat Frankfurters or the like in the intermediate units 2. The heat passes through a plurality of apertures A provided in drip pan D which is mounted in the foundation unit in any desired way and is adapted to protect the heater from the drippings. Lead lines B connect the ends of each resistance element 9 to a switch 12 of an approved construction which is mounted upon one side of the foundation unit by a plurality of screws 13. The switch is provided with a knife plug 14 which can be connected with a suitable source of electric current, such as the customary house current, in order to supply electricity to the resistance heating elements 9. By turning knob 15 of the switch the current may be turned on or off or to a high or low heat. Of course, it is possible to replace switch 12 with a rheostat so that any desired amount of electricity may be permitted to flow to the heating elements, and, thus any desired heat maintained in the roaster. With the illustrated switch, however, the proper temperatures for roasting or heating Frankfurters may be maintained in the roaster.

The intermediate units 2 which are supported by the foundation unit 1 may be of any suitable number. In the illustrative embodiment of my invention two intermediate units are shown although more units may be employed in other instances. Each intermediate unit has a frame 16 which is preferably of cast construction. The frame has a bead 17 around the lower edge thereof adapted to fit or to seat on the shoulder 18 of the foundation unit. The upper edge of frame 16 is provided with a shoulder 19 which is similar to shoulder 18 and is adapted to cooperate with the bottom of the next upper intermediate unit. With this construction the various units may be mounted and superimposed upon each other to form a stable and a solid structure.

A drawer or tray 20 is provided for each intermediate unit. The drawer may have any suitable construction depending on the type of products to be treated but in the case of Frankfurters, I prefer to employ a series of grid bars 21, which extend from a rear cross bar 22, across a reinforcing cross bar 23, and then to the front 24 of the drawer. The alternate grid bars are depressed to form individual cells or compartments which can hold one Frankfurter. The outer side of each end grid bar of the tray is provided with a tongue 25 which fits in a groove 26 cut in the frame. By grasping handle 27 the tray may be withdrawn from or inserted into the roaster. In order to hold the tray in its closed position in the roaster a spring 28 is secured to the front 24 of the tray and is adapted to bear against a flange 29.

The top unit or dome 3 has a depending edge 28 which is shaped and proportioned to fit against shoulder 19 of the uppermost intermediate unit and thus close the roaster. The upper surface of dome 3 may be developed in any appropriate manner to form a design, ornament, or the like. For instance, it is illustrated in the drawings as an upstanding plate or shield 30 which may be used as a name plate or a trade mark plate or the like.

The roaster hereinabove described may be fabricated of any suitable material but I prefer to employ cast aluminum because of its excellent heat transmitting ability, its clean appearance and corrosion resistance, and its especial adaptability for roasting meat products like Frankfurters.

The operation of my improved roaster is obvious to those skilled in the art. The trays are withdrawn and are filled with Frankfurters by placing the latter upon the grid bars. Electricity is then supplied to the heating elements by turning on the switch. The heat generated by the resistance elements heats the metallic grid bars and frames. Due to the fact that the Frankfurters are exposed practically all portions of them are uniformly heated and roasted. During the roasting the juice drips from tray to tray over the Frankfurters and finally to drip pan D in the foundation unit. As the atmosphere in the roaster is always moist due to the evaporation of water, etc. from the Frankfurters, and as there is no direct surface contact between the Frankfurters and the heating elements, the Frankfurters remain tender and juicy. If the Frankfurters are not to be dispensed immediately, they can remain in the roaster and can be maintained in a palatable state by maintaining a low heat. In this way a reserve supply of Frankfurters may be maintained in the roaster without any danger of them becoming tough and hard or being contaminated with dirt and the like. A great many variations in roasting Frankfurters may be practised as one skilled in the art will readily understand. For instance, the fresh Frankfurters may be first placed in the upper tray and afterwards the entire tray may be removed to a lower position so as to complete the roasting process.

In Figs. 11 to 14 a modified locking joint for the units is illustrated. The top 50 of a unit 51 is provided with a plurality of lugs 52 which project upwardly. Each lug has a groove 53 on its inner face for engaging the tongue 54 on a drawer 55. The bottom 56 of another unit 57 has a plurality of depending lugs 58 secured to the wall thereof and spaced to fit into the spaces between lugs 52 on the lower unit (see Fig. 11). Projecting from each depending lug 58 is a rib 59. When the two units are mounted together and the tray is in place, the units are locked together because ribs 59 are hooked under the bottom of tongue 54 (see Figs. 11 and 12) and tongues 54 are in engagement with groove 53. It is obvious that with this construction a sectional roaster is provided with units which are positively locked to each other.

In some instances it may be desirable to use a tray having a different type of front than that described hereinabove. A modified tray is illustrated in Figs. 15 and 16. This drawer has the same general construction as the drawer used in the roaster illustrated in Fig. 1 except that instead of having a fixed front or cover, a hinged cover H is provided. The hinge joining the cover to the grid bars G may have any appropriate construction. In the drawings I have shown the cover as having a projecting portion P which is pinned to a lug L at each side thereof by means of a screw S. Of course, a handle K is secured to the front of the door and a closing spring C is provided on the upper edge of the door. When the tray is to be withdrawn the cover is turned until it is approximately horizontal and then a pull is applied to the handle to withdraw the tray. After the tray has been withdrawn the cover is allowed to hang downwardly (as indicated by the dotted lines E) and the roasted Frankfurters are replaced by fresh Frankfurters. Upon closing the drawer the cover occupies an upright position shown by the dotted lines U. By the use of the described hinged cover for trays, the latter may be quickly opened and made easily accessible. With this structure, therefore, Frankfurters may be readily charged into and removed from the trays.

I claim:

1. A sectional roaster for Frankfurters comprising a foundation unit consisting of a cast aluminum frame, a lining in the interior of said frame of heat insulating material, at least one electrical heating element mounted in said lined frame, and a drip pan containing heat outlet holes positioned in the frame to catch the drippings; at least one intermediate unit superimposed on said foundation unit so that the bead of the former seats on the shoulder of the latter; a tray slidably positioned in said intermediate unit and provided with grid bars for holding the Frankfurters, and a dome to close the top of the uppermost intermediate unit.

2. A sectional roaster for Frankfurters comprising a foundation unit containing an electrical heater and having interlocking means incorporated therein, an intermediate unit seated upon said foundation unit and provided with interlocking means to cooperate with the said interlocking means, a tray slidably mounted in said intermediate unit and adapted to engage the aforesaid interlocking means whereby the two units will be locked together, and a dome seated on the top of the intermediate unit.

3. A roaster such as set forth in claim 1 in which the tray is provided with a hinged front cover.

4. A sectional roaster for Frankfurters comprising a foundation unit containing an electrical heating element, a plurality of superposed, interchangeable, intermediate mating hollow sectional units mounted upon said foundation unit and provided with cooperating interlocking means, each of said sectional units being provided with a seat at the top thereof and with a bead of the same size as said seat at the bottom thereof whereby as many section units as desired can be built upon each other by seating the bead of an upper sectional unit on the seat of a sectional unit immediately underneath, a Frankfurter tray slidably positioned in each of said hollow intermediate sectional units and adapted to engage the aforesaid cooperating interlocking means of adjacent sections whereby two adjacent units will be locked together, and a dome fitted upon the uppermost intermediate unit.

5. A sanitary Frankfurter roaster having a large storage space for roasted Frankfurters comprising a foundation unit containing an electrical heating element, a plurality of superposed, intermediate, interchangeable, mating hollow sectional units having a relatively narrow depth and a large open area mounted upon said foundation unit, each of said sectional units being provided with a seat at the top thereof and with a shoulder of the same size as said seat at the bottom thereof whereby as many sectional units as desired can be built upon each other by seating the shoulder of an upper sectional unit on a seat of a sectional unit immediately underneath, an interchangeable Frankfurter tray slidably positioned in each of said hollow intermediate sectional units and provided with a multiplicity of individual open cells for Frankfurters whereby substantially the entire cross section of each sectional unit is open for the free upward flow of roasting heat from the electrical heating element to the Frankfurters on each and every tray in the roaster, said interchangeable organization of units and trays being such that Frankfurters can be roasted in the bottom unit above the heater and when fully roasted can be interchanged with an upper tray without disturbing the rest of the roaster, and a dome fitted upon the uppermost intermediate unit, said trays being so arranged with respect to the said units and dome that they can be removed and cleaned individually without disturbing the rest of the roaster.

In testimony whereof I have hereunto set my hand.

OTTO PAUL RICHARD LEHMANN.